US012638621B2

(12) United States Patent
Hayashi et al.

(10) Patent No.: US 12,638,621 B2
(45) **Date of Patent: *May 26, 2026**

(54) CHOLESTERIC LIQUID CRYSTAL FILM AND MANUFACTURING METHOD THEREOF

(71) Applicant: FUJIFILM Corporation, Tokyo (JP)

(72) Inventors: Takahiro Hayashi, Kanagawa (JP); Satoshi Kuniyasu, Kanagawa (JP); Mitsuyoshi Ichihashi, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/876,315

(22) Filed: Jul. 28, 2022

(65) Prior Publication Data

US 2022/0373726 A1 Nov. 24, 2022

Related U.S. Application Data

(63) Continuation of application No. PCT/JP2020/047689, filed on Dec. 21, 2020.

(30) Foreign Application Priority Data

Jan. 31, 2020 (JP) ................................ 2020-015749

(51) Int. Cl.

*G02F 1/1333* (2006.01)
*B26D 3/08* (2006.01)
*G02B 5/18* (2006.01)

(52) U.S. Cl.

CPC ............ *G02B 5/1852* (2013.01); *B26D 3/08* (2013.01); *G02B 5/1833* (2013.01)

(58) Field of Classification Search

CPC .... G02F 1/13; G02F 1/1333; G02F 1/133543; G02F 1/137; G02F 1/13718; C09K 19/38; C09K 2019/0444

See application file for complete search history.

(56) References Cited

U.S. PATENT DOCUMENTS

| | | | | |
|---|---|---|---|---|
| 6,410,130 | B1 | 6/2002 | Schuhmacher et al. | |
| 6,537,624 | B1 | 3/2003 | Suzuki et al. | |
| 6,605,235 | B1 | 8/2003 | Meyer et al. | |
| 6,627,270 | B1 | 9/2003 | Nishimura | |
| 10,459,132 | B2 * | 10/2019 | Yamamoto | G02B 5/0226 |
| 11,209,688 | B2 * | 12/2021 | Katoh | H10K 50/00 |
| 11,732,194 | B2 * | 8/2023 | Kodama | C09K 19/586 356/369 |
| 11,828,960 | B2 | 11/2023 | Sasata et al. | |
| 11,919,327 | B2 | 3/2024 | Kaneiwa | |
| 11,977,306 | B2 | 5/2024 | Hayashi et al. | |
| 2002/0045676 | A1 | 4/2002 | Coates et al. | |
| 2002/0159019 | A1 | 10/2002 | Pokorny et al. | |
| 2003/0086044 | A1 | 5/2003 | Inque et al. | |
| 2003/0090618 | A1 | 5/2003 | Kashima | |
| 2006/0152656 | A1 | 7/2006 | Kashima et al. | |
| 2007/0258024 | A1 | 11/2007 | Parri et al. | |
| 2010/0182545 | A1 | 7/2010 | Kashima et al. | |
| 2017/0227692 | A1 | 8/2017 | Nagai et al. | |
| 2017/0343830 | A1 | 11/2017 | Nagai et al. | |
| 2018/0164480 | A1 | 6/2018 | Yoshida | |
| 2019/0033634 | A1 | 1/2019 | Katoh et al. | |
| 2019/0196245 | A1 | 6/2019 | Ichihara et al. | |
| 2019/0391479 | A1 | 12/2019 | Katoh et al. | |
| 2020/0183214 | A1 | 6/2020 | Katoh | |
| 2020/0409202 | A1 | 12/2020 | Kodama et al. | |
| 2021/0026049 | A1 | 1/2021 | Saitoh et al. | |
| 2021/0116615 | A1 | 4/2021 | Kodama et al. | |
| 2021/0208316 | A1 | 7/2021 | Sato et al. | |
| 2022/0333013 | A1 * | 10/2022 | Hayashi | C09K 19/36 |
| 2022/0372372 | A1 * | 11/2022 | Hayashi | C09K 19/586 |
| 2022/0373726 | A1 * | 11/2022 | Hayashi | G02B 5/1833 |

FOREIGN PATENT DOCUMENTS

| | | | |
|---|---|---|---|
| CN | 1527956 | A | 9/2004 |
| CN | 1573458 | A | 2/2005 |
| CN | 1823284 | A | 8/2006 |
| CN | 107111029 | A | 8/2017 |
| CN | 107250910 | A | 10/2017 |
| CN | 108885293 | A | 11/2018 |
| CN | 109716181 | A | 5/2019 |
| EP | 1 045 260 | A1 | 10/2000 |
| JP | 2000-95883 | A | 4/2000 |
| JP | 2001-172329 | A | 6/2001 |
| JP | 2001-515094 | A | 9/2001 |

(Continued)

OTHER PUBLICATIONS

International Preliminary Report on Patentability and Written Opinion of the International Searching Authority (Forms PCT/IB/326, PCT/IB/373, and PCT/ISA/237) for International Application No. PCT/JP2020/047689, dated Aug. 11, 2022, with an English translation.

International Search Report (Form PCT/ISA/210) for International Application No. PCT/JP2020/047689, dated Feb. 16, 2021, with an English translation.

Japanese Notice of Reasons for Refusal for corresponding Japanese Application No. 2021-574540 dated May 30, 2023, with an English translation.

Japanese Decision of Refusal for Japanese Application No. 2021-574539, dated Oct. 24, 2023, with an English translation.

(Continued)

*Primary Examiner* — Geraldina Visconti

(74) *Attorney, Agent, or Firm* — Birch, Stewart, Kolasch & Birch, LLP

(57) ABSTRACT

Provided are a cholesteric liquid crystal film including a cholesteric liquid crystal, in which the cholesteric liquid crystal film has a stripe pattern in which dark portions and bright portions are alternately arranged in a straight line on an upper surface observed with a microscope; and a manufacturing method thereof.

5 Claims, 5 Drawing Sheets

(56) References Cited

FOREIGN PATENT DOCUMENTS

| | | | | | |
|---|---|---|---|---|---|
| JP | 2002-189124 | A | | 7/2002 | |
| JP | 2005-37735 | A | | 2/2005 | |
| JP | 2005-49866 | A | | 2/2005 | |
| JP | 2007-94625 | A | | 4/2007 | |
| JP | 2008-505369 | A | | 2/2008 | |
| JP | 2013-120350 | A | | 6/2013 | |
| JP | 2013-233733 | A | | 11/2013 | |
| JP | 2018-180122 | A | | 11/2018 | |
| KR | 10-2019-0026916 | A | | 3/2019 | |
| WO | WO 99/34242 | A1 | | 7/1999 | |
| WO | WO 2016/194961 | A1 | | 12/2016 | |
| WO | WO-2017221806 | A1 | * | 12/2017 | ............... G02B 5/30 |
| WO | WO 2018/043678 | A1 | | 3/2018 | |
| WO | WO 2018/159751 | A1 | | 9/2018 | |
| WO | WO 2019/035449 | A1 | | 2/2019 | |
| WO | WO 2019/181247 | A1 | | 9/2019 | |
| WO | WO 2019/182052 | A1 | | 9/2019 | |
| WO | WO 2019/187951 | A1 | | 10/2019 | |
| WO | WO 2019/189586 | A1 | | 10/2019 | |
| WO | WO 2020/066429 | A1 | | 4/2020 | |
| WO | WO 2020/196659 | A1 | | 10/2020 | |

OTHER PUBLICATIONS

Japanese Notice of Reasons for Refusal for corresponding Japanese Application No. 2021-574540, dated Oct. 24, 2023, with an English translation.
Chinese Office Action and Search Report for Chinese Application No. 202080091366.8, dated Jul. 12, 2023, with a partial English translation.
Chinese Office Action and Search Report for Chinese Application No. 202080095223.4, dated Aug. 5, 2023, with a partial English translation.
Chinese Office Action and Search Report for corresponding Chinese Application No. 202080095000.8, dated Sep. 16, 2023, with an English translation.
International Preliminary Report on Patentability and Written Opinion of the International Searching Authority (Forms PCT/IB/326, PCT/IB/373, and PCT/ISA/237) for International Application No. PCT/JP2020/043477, dated Aug. 11, 2022, with an English translation.
International Preliminary Report on Patentability and Written Opinion of the International Searching Authority (Forms PCT/IB/326, PCT/IB/373, and PCT/ISA/237) for International Application No. PCT/JP2020/047688, dated Aug. 11, 2022, with an English translation.
International Search Report (Form PCT/ISA/210) for International Application No. PCT/JP2020/043477, dated Feb. 9, 2021, with an English translation.
International Search Report (Form PCT/ISA/210) for International Application No. PCT/JP2020/047688, dated Feb. 16, 2021, with an English translation.
Japanese Notice of Reasons for Refusal for Japanese Application No. 2021-574482, dated Feb. 14, 2023, with an English translation.
Japanese Office Action dated May 30, 2023 for Application No. 2021-574539 with an English translation.
U.S. Office Action for U.S. Appl. No. 17/874,489, dated Jul. 27, 2023.
Chinese Office Action for Chinese Application No. 202080095223.4, dated Jan. 25, 2024, with an English translation.
U.S. Office Action for U.S. Appl. No. 17/858,561, dated Feb. 7, 2024.
U.S. Office Action for U.S. Appl. No. 17/874,489, dated Feb. 14, 2024.
Korean Office Action for Korean Application No. 10-2022-7021871, dated Jun. 19, 2024, with an English translation.
Japanese Office Action for Japanese Application No. 2021-574539, dated Apr. 2, 2024, with an English translation.
Korean Office Action for Korean Application No. 10-2022-7025941, dated Jun. 25, 2024, with an English translation.
Chinese Office Action and Search Report for corresponding Chinese Application No. 202080095000:8, dated Jun. 8, 2024, with an English translation.
U.S. Office Action for U.S. Appl. No. 17/858,561, dated Jul. 29, 2024.
Japanese Office Action for corresponding Japanese Application No. 2021-574540, dated Mar. 26, 2024, with an English translation.
U.S. Office Action for U.S. Appl. No. 17/874,489, dated May 22, 2024.
U.S. Office Action for U.S. Appl. No. 17/874,489, dated Jan. 15, 2025.
U.S. Advisory Action for U.S. Appl. No. 17/858,561, dated Oct. 9, 2024.
U.S. Office Action for U.S. Appl. No. 17/858,561, dated Mar. 12, 2025.
Korean Office Action for corresponding Korean Application No. 10-2022-7026360, dated May 16, 2025, with English translation.
U.S. Office Action for U.S. Appl. No. 17/874,489, dated Aug. 1, 2025.
South Korean Office Action for corresponding South Korean Application No. 10-2022-7026360, dated Oct. 7, 2024, with an English translation.
Japanese Office Action for corresponding Japanese Application No. 2021-574540, dated Jul. 23, 2024, with an English translation.

* cited by examiner

CHOLESTERIC LIQUID CRYSTAL FILM AND MANUFACTURING METHOD THEREOF

CROSS-REFERENCE TO RELATED APPLICATIONS

This application is a continuation application of International Application No. PCT/JP2020/047689, filed Dec. 21, 2020, the disclosure of which is incorporated herein by reference in its entirety. Further, this application claims priority from Japanese Patent Application No. 2020-015749, filed Jan. 31, 2020, the disclosure of which is incorporated herein by reference in its entirety.

BACKGROUND OF THE INVENTION

1. Field of the Invention

The present disclosure relates to a cholesteric liquid crystal film and a manufacturing method thereof.

2. Description of the Related Art

By microscopic observation, it is known that a cholesteric liquid crystal film has a stripe pattern consisting of dark portions and a bright portion.

For example, FIG. 6 of WO2018/043678A shows an image of a cross section of the cholesteric liquid crystal film by SEM, and the stripe pattern consisting of the dark portions and the bright portions is confirmed.

For example, FIG. 5 of JP2005-37735A shows an image of a cross-sectional structure captured by a transmission electron microscope of a cholesteric liquid crystal polarization selective reflective layer, and the stripe pattern consisting of the dark portions and the bright portions is confirmed.

SUMMARY OF THE INVENTION

The stripe pattern consisting of the dark portions and the bright portions in the cholesteric liquid crystal film seen by the microscopic observation indicates an arrangement state of a cholesteric liquid crystal.

In a case where the stripe pattern consisting of the dark portions and the bright portions is seen by the microscopic observation from an upper surface, since a refractive index changes periodically, it is expected that an application of the cholesteric liquid crystal film will be widened.

Therefore, the present disclosure has been made in view of the above-described circumstances.

An object of an embodiment of the present disclosure is to provide a cholesteric liquid crystal film in which a refractive index changes periodically and a manufacturing method thereof.

The specific methods for achieving the objects include the following aspects.

<1> A cholesteric liquid crystal film comprising:

a cholesteric liquid crystal, in which the cholesteric liquid crystal film has a stripe pattern in which dark portions and bright portions are alternately arranged in a straight line on an upper surface observed with a microscope.

<2> The cholesteric liquid crystal film according to <1>, in which the upper surface observed with a microscope has a bonding point at which the dark portions are bonded to each other, and the number of the bonding points is 10 or less per 50 μm square area.

<3> The cholesteric liquid crystal film according to <1> or <2>, in which a distance between adjacent dark portions is 0.01 μm to 50 μm.

<4> The cholesteric liquid crystal film according to any one of <1> to <3>, in which the cholesteric liquid crystal film has a stripe pattern in which dark portions and bright portions are alternately arranged on a cross section in a thickness direction observed with a microscope, and the dark portions are inclined with respect to a main surface.

<5> The cholesteric liquid crystal film according to <4>, in which an inclined angle of the dark portions with respect to the main surface is 20° to 90°.

<6> A manufacturing method of a cholesteric liquid crystal film, comprising:

a first step of applying a coating liquid including a solvent, a liquid crystal compound, and a chiral agent onto a substrate to form a coating film; and a second step of applying a shearing force to a surface of the formed coating film with a blade, in which a shear rate in the second step is 1000 $seconds^{-1}$ or more.

According to the present disclosure, a cholesteric liquid crystal film in which a refractive index changes periodically and a manufacturing method thereof are provided.

DESCRIPTION OF THE PREFERRED EMBODIMENTS

Figure 1:
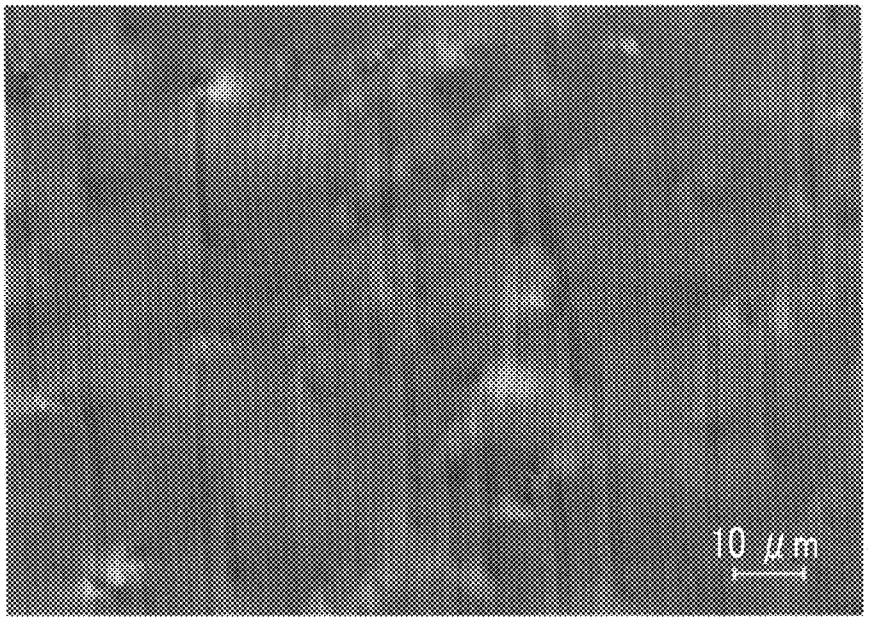
FIG. 1 is an example of a microscopic observation image from an upper surface of a cholesteric liquid crystal film according to an embodiment of the present disclosure (specifically, a cholesteric liquid crystal film of Example 1).

Hereinafter, embodiments of the present disclosure will be described in detail. The present disclosure is not limited in any way to the following embodiments, and may be implemented with appropriate modifications within the scope of the purpose of the present disclosure.

In a case where the embodiments of the present disclosure are described with reference to the drawings, the description of overlapping constituent elements and reference numerals may be omitted in the drawings. The constituent elements indicated by the same reference numeral in the drawings mean the same constituent element. A dimensional ratio in the drawing does not necessarily represent the actual dimensional ratio.

The numerical range indicated by using "to" in the present disclosure indicates a range including numerical values described before and after "to" as a lower limit value and an upper limit value, respectively. Regarding numerical ranges which are described stepwise in the present disclosure, an upper limit value or a lower limit value described in a numerical value may be replaced with an upper limit value or a lower limit value of another stepwise numerical range. In addition, regarding a numerical range described in the present disclosure, an upper limit value or a lower limit value described in a numerical value may be replaced with a value described in Examples.

In the present disclosure, the amount of each component in a coating liquid means, in a case where the coating liquid contains a plurality of substances corresponding to such a component, the total amount of the plurality of substances in the coating liquid, unless otherwise specified.

In the present disclosure, a term "step" not only includes an independent step, but also includes a step, in a case where the step may not be distinguished from the other step, as long as the expected object of the step is achieved.

In the present disclosure, a combination of two or more preferred aspects is a more preferred aspect.

In the present disclosure, an "upper surface" means an observation surface of the cholesteric liquid crystal film with a microscope, and corresponds to a main surface of the cholesteric liquid crystal film.

In the present disclosure, a "main surface" means a surface having a main area on a surface of an object, and a term "pair of main surfaces" corresponds to a front surface and a back surface of a film-like material such as the cholesteric liquid crystal film.

From the viewpoint of manufacturing, the "pair of main surfaces" are preferably arranged parallel to each other. Here, the "parallel to each other" means that an angle formed by one main surface and the other main surface is less than ±5 degrees.

In the present disclosure, a "molecular axis" means an axis which passes through a center of a molecular structure along a longitudinal direction of the molecular structure. However, a "molecular axis" used for a disk-like liquid crystal compound means an axis which intersects a disc plane of the disk-like liquid crystal compound at a right angle.

In the present disclosure, a "solid content" means components obtained by excluding a solvent from all components of an object.

In the present disclosure, a "mass of solid content" means a mass obtained by substracting a mass of the solvent from a mass of the object.

<Cholesteric Liquid Crystal Film>

A cholesteric liquid crystal film according to an embodiment of the present disclosure includes a cholesteric liquid crystal, in which the cholesteric liquid crystal film has a stripe pattern in which dark portions and bright portions are alternately arranged in a straight line on an upper surface observed with a microscope.

That is, by observing the upper surface of the cholesteric liquid crystal film according to the embodiment of the present disclosure with a microscope, the stripe pattern in which the dark portions and the bright portions are alternately arranged in a straight line can be seen on the upper surface.

In the present disclosure, the "stripe pattern in which the dark portions and the bright portions are alternately arranged in a straight line" is also referred to as a "linear stripe pattern".

As described above, the cholesteric liquid crystal film according to the embodiment of the present disclosure has the stripe pattern in which the bright portions and the dark portions are alternately arranged in a straight line on the upper surface observed with a microscope.

By having such a stripe pattern, it is presumed that a refractive index changes periodically according to an interval between the dark portions and the bright portion.

As a result, it is considered that the cholesteric liquid crystal film according to the embodiment of the present disclosure can be applied to a diffraction grating, a polarizer, an antireflection film, and the like by using the function of periodically changing the refractive index.

In WO2018/043678A and JP2005-37735A described above, although the stripe pattern in which the dark portions and the bright portions are alternately arranged is seen on the liquid crystal film, all of them are seen by observing a cross section of the liquid crystal film in the thickness direction (that is, all of them are not seen by microscopic observation from the upper surface), and do not have the configuration of the cholesteric liquid crystal film according to the embodiment of the present disclosure.

[Cholesteric Liquid Crystal]

The cholesteric liquid crystal film according to the embodiment of the present disclosure includes a cholesteric liquid crystal.

The cholesteric liquid crystal has a laminated structure in which layers composed of molecular groups of liquid crystal compounds are stacked. In each layer, the molecules of each liquid crystal compound are arranged in a certain direction (that is, molecular axes are arranged in a certain direction), and a helical structure is formed by shifting an arrangement direction of the molecules of each layer so as to revolve in a helical shape as the molecules progress in a lamination direction.

The axis of this helical structure is called a helical axis of the cholesteric liquid crystal.

[Microscopic Observation from Upper Surface]

As described above, in the cholesteric liquid crystal film according to the embodiment of the present disclosure has, the linear stripe pattern can be seen on the upper surface observed with a microscope.

An optical microscope, a scanning electron microscope (also referred to as SEM), or a polarization microscope is used for the microscopic observation. In the microscopic observation, an optical microscope, a scanning electron microscope (SEM), and a polarization microscope may be used properly depending on a magnitude of a pitch of the stripe pattern (that is, a distance between the dark portions or a distance between the bright portions).

In addition, a scanning electron microscope (SEM) is used for the microscopic observation, a cutting surface obtained by cutting a pair of main surfaces (that is, a front surface and a back surface) of the cholesteric liquid crystal film with a microtome is determined as the upper surface, and this cutting surface is observed. In a case where a cutting thickness is 10% or less (preferably 5% by mass or less) of a film thickness of the cholesteric liquid crystal film, the observation on the cutting surface may be regarded as the observation of an arrangement state of the liquid crystal compound on the upper surface. The cutting thickness is preferably 0.5 μm or less.

It is sufficient that the microscopic observation from the upper surface is performed on both of the pair of main surfaces (that is, the front surface and the back surface) of the cholesteric liquid crystal film, and at least one thereof shows the linear stripe pattern, but it is preferable that the linear stripe pattern is seen on both sides.

Here, an area of the upper surface to be observed is, for example, at least 10000 $\mu m^2$.

In the above-described microscopic observation in the present disclosure, at least 10 linear dark portions and bright portions alternately arranged are regarded as the "linear stripe pattern".

In the present disclosure, the term "linear" includes not only a geometrically exact straight line but also a line which can be regarded as a substantially straight line, which may be a slightly curved line or a line including a curved portion in part. More specifically, the "linear" means that each of the dark portions and the bright portions may have a certain amount of swing width with a direction in which the dark portions and the bright portions extend as a reference line.

As a specific value of the swing width, 5 μm or less is preferable and 2 μm or less is more preferable.

Here, the above-described swing width is obtained by the following method.

The explanation will be given by taking the dark portions as an example.

First, in the microscopic observation from the upper surface, two points separated by 50 μm in a longitudinal direction are taken at a central portion in a width direction of one dark portion, and a straight line connecting these two points is referred to as the above-described "reference line". A distance between the central portion in the width direction of the dark portion, which is the farthest from the reference line in the same dark portion, and the reference line is measured, and this distance is determined as the swing width.

A method of obtaining the swing width in the bright portions is the same as above.

(Linear Stripe Pattern)

The linear stripe pattern in the cholesteric liquid crystal film according to the embodiment of the present disclosure will be described with reference to FIG. 1.

Here, FIG. 1 is an example of a microscopic observation image from the upper surface of the cholesteric liquid crystal film according to the embodiment of the present disclosure.

As shown in FIG. 1, the cholesteric liquid crystal film according to the embodiment of the present disclosure has a stripe pattern in which dark portions and bright portions are alternately arranged in a straight line.

The dark portions and the bright portions seen by the microscopic observation appear because the orientation of the molecular axis of the liquid crystal compound forming the helical structure changes with respect to the observation surface (that is, the upper surface).

In a case of observing a cholesteric liquid crystal film including a rod-like liquid crystal compound with a polarization microscope, a region where the orientation of the molecular axis of the rod-like liquid crystal compound is orthogonal to the observation surface (including a state close to orthogonal to the observation surface; the same applies hereinafter), and the region looks relatively bright.

On the other hand, in a case of observing the cholesteric liquid crystal film including a rod-like liquid crystal compound with a polarization microscope, a region where the orientation of the molecular axis of the rod-like liquid crystal compound is parallel to the observation surface (including a state close to parallel to the observation surface; the same applies hereinafter), and the region looks relatively dark.

By alternately arranging the above-described two regions in a straight line, the stripe pattern in which the bright portions and the dark portions are alternately arranged in a straight line can be seen.

In the linear stripe pattern, a distance between adjacent dark portions is not particularly limited and may be determined according to the application, and for example, the distance is preferably 0.01 μm to 50 μm, more preferably 0.05 μm to 10 μm, and still more preferably 0.1 μm to 5 μm.

In a case where a helical pitch of the cholesteric liquid crystal increases, the distance between adjacent dark portions tends to increase. On the other hand, in a case where a helical pitch decreases, the distance between adjacent dark portions tends to decrease.

By having the distance between adjacent dark portions as described above, for example, the cholesteric liquid crystal film according to the embodiment of the present disclosure is suitable for a diffraction grating.

The distance between adjacent dark portions is obtained by the following method.

In the microscopic observation from the upper surface, the shortest distance between 5 sets of adjacent dark portions is measured. More specifically, first, 6 dark portions adjacent to each other are selected, and 5 sets of adjacent dark portions are extracted from the 6 dark portions. Thereafter, as the shortest distance between adjacent dark portions, the shortest distance between the center of one dark portion in a width direction and the center of the other dark portions in the width direction in the sets is measured. This measurement is performed for 5 sets, and an arithmetic mean value of the measured values for the 5 sets is defined as the distance between dark portions.

(Bonding Point)

In the present disclosure, according to the microscopic observation from the upper surface, a linear stripe pattern is seen in most of the area, but a bonding point where the dark portions are bonded to each other may be seen.

The bonding point will be described with reference to FIGS. 2A to 2D.

Here, FIGS. 2A to 2D are schematic diagrams showing an example of the stripe pattern seen by the microscopic observation from the upper surface.

As shown in FIGS. 2A to 2D, in the stripe pattern, there is a bonding point 30 at which dark portions 10 existing nearby are bonded to each other.

Figure 2A:
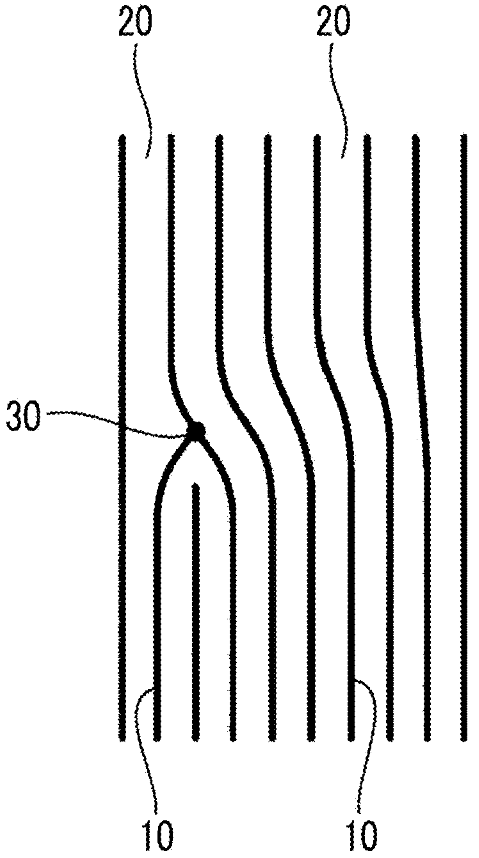
FIG. 2A is a schematic diagram showing an example of a stripe pattern seen by a microscopic observation from the upper surface.

In FIG. 2A, there is one bonding point 30 at which the dark portions 10 are bonded to each other.

Figure 2B:
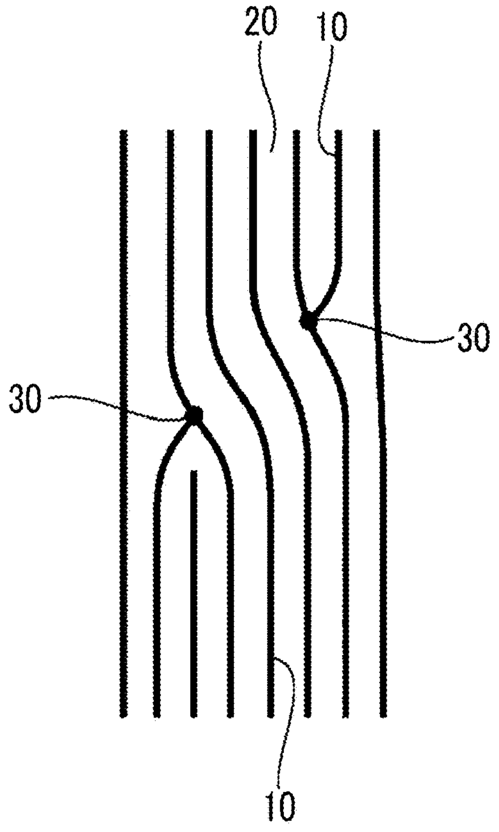
FIG. 2B is a schematic diagram showing the example of a stripe pattern seen by a microscopic observation from the upper surface.
Figure 2C:
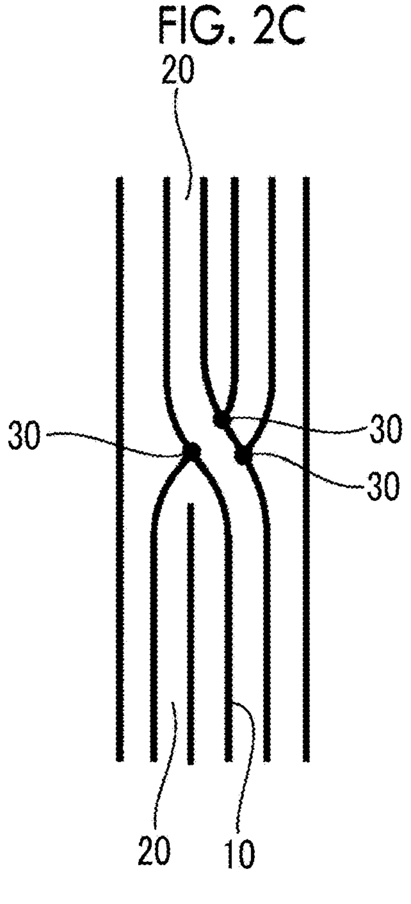
FIG. 2C is a schematic diagram showing the example of a stripe pattern seen by a microscopic observation from the upper surface.
Figure 2D:
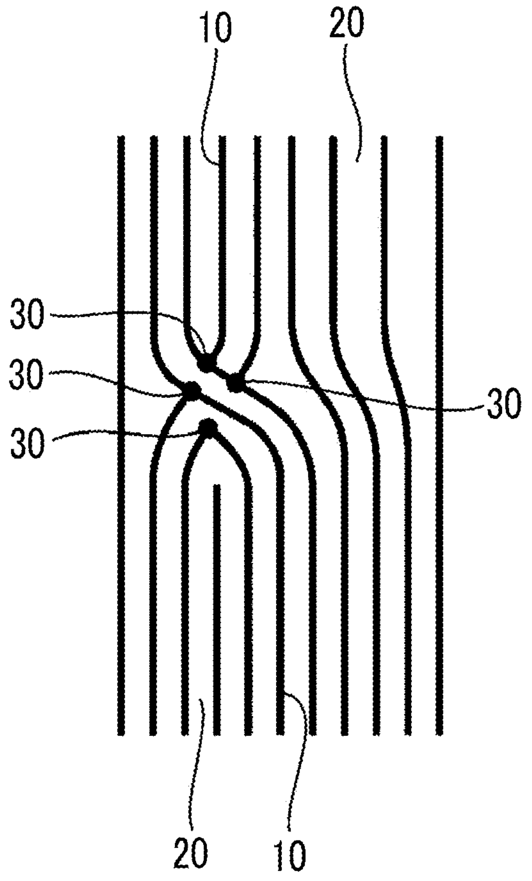
FIG. 2D is a schematic diagram showing the example of a stripe pattern seen by a microscopic observation from the upper surface.

Similarly, there are two bonding points 30 in FIG. 2B, three bonding points 30 in FIG. 2C, and four bonding points 30 in FIG. 2D.

Since the dark portions 10 and the bright portions 20 are alternately arranged in the stripe pattern, at the bonding points 30, the bright portions 20 may also be bonded to each other because there is a bonding point 30 at which the dark portions 10 are bonded to each other.

The number of bonding points is preferably small because it is a portion which breaks the shape of the linear stripe pattern.

Specifically, the number of bonding points is, for example, preferably 10 or less, more preferably 5 or less, and still more preferably 3 or less per 50 μm square area.

The lower limit of the number of bonding points is most preferably 0 per 50 μm square area, but from the viewpoint of reducing the swing width of the dark portions (or the bright portions) described above and increasing linearity of the dark portions (or the bright portions), the lower limit may be 1 or more.

The number of bonding points is obtained by the following method.

In the microscopic observation from the upper surface, the number of bonding points existing in 50 μm square is measured at five points by changing the position.

An arithmetic mean value of the number of bonding points obtained at the five points is defined as the number of bonding points.

[Microscopic Observation of Cross Section in Thickness Direction]

The cholesteric liquid crystal film according to the embodiment of the present disclosure has a stripe pattern (hereinafter, also referred to as a cross-sectional stripe pattern) in which the dark portions and the bright portions are alternately arranged in a cross section in a thickness direction observed with a microscope.

The cross-sectional stripe pattern will be described with reference to FIG. 3. Here, FIG. 3 is a schematic diagram showing an example of the stripe pattern (that is, the cross-sectional stripe pattern) seen by a microscopic observation of the cross section of the cholesteric liquid crystal film in the thickness direction.

Figure 3:
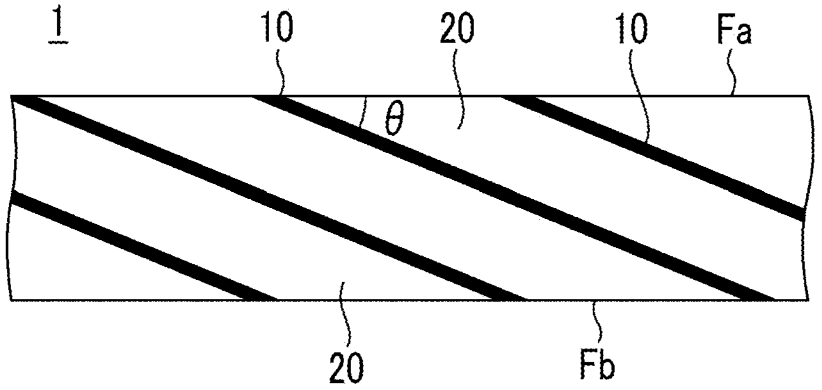
FIG. 3 is a schematic diagram showing an example of a stripe pattern (that is, a cross-sectional stripe pattern) seen by a microscopic observation of a cross section of the cholesteric liquid crystal film in a thickness direction.

As shown in FIG. 3, a cholesteric liquid crystal film 1 has a stripe pattern in which dark portions 10 and bright portions 20 are alternately arranged.

Same as the stripe pattern (that is, the dark portions and the bright portions) seen by the microscopic observation from the upper surface, the cross-sectional stripe pattern appears because the orientation of the molecular axis of the liquid crystal compound forming the helical structure changes with respect to the cross section observed with a microscope.

A scanning electron microscope (that is, SEM) or a polarization microscope is used for the microscopic observation of the cross section in the thickness direction. In the microscopic observation of the cross section in the thickness direction, a scanning electron microscope (SEM) and a polarization microscope may be used properly depending on a magnitude of a pitch of the stripe pattern (that is, a distance between the dark portions or a distance between the bright portions).

In order to obtain the cross section in the thickness direction, for example, the cholesteric liquid crystal film may be cut with a microtome.

In addition, the cross section in the thickness direction may be observed at 18 points (that is, 180°) by rotating the cutting surface in increments of 10°. It is sufficient that the stripe pattern and a folded structure are seen in at least one of the 18 points.

Here, an area of the cross section to be observed is, for example, at least 1000 $\mu m^2$.

In addition, in the above-described microscopic observation of the cross section in the thickness direction in the present disclosure, at least 10 dark portions and bright portions alternately arranged are regarded as the "cross-sectional stripe pattern".

The relationship between the molecular axis of the liquid crystal compound and the cross-sectional stripe pattern will be described in more detail.

Figure 4:
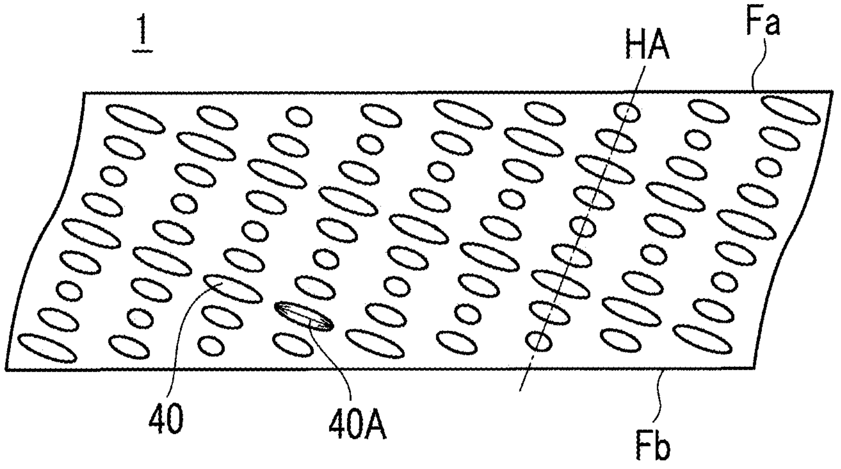
FIG. 4 is a schematic diagram showing an example of a molecular arrangement of a rod-like liquid crystal compound in the cross section of the cholesteric liquid crystal film.

In a case where the dark portions and the bright portions are seen in the microscopic observation of the cross section in the thickness direction, it is considered that molecules of the liquid crystal compound in the cholesteric liquid crystal film are arranged as shown in FIG. 4, for example. Here, FIG. 4 is a schematic diagram showing an example of a molecular arrangement of a rod-like liquid crystal compound in the cross section of the cholesteric liquid crystal film.

The cholesteric liquid crystal film 1 shown in FIG. 4 has a pair of main surfaces (that is, main surfaces Fa and Fb) and includes rod-like liquid crystal compounds 40 shown by an ellipse. The rod-like liquid crystal compounds 40 are in a form of the cholesteric liquid crystal and are arranged helically along a helical axis HA.

That is, since the rod-like liquid crystal compounds 40 in the cholesteric liquid crystal film 1 are arranged in a helical shape, the orientation of the molecular axis 40A with respect to the cross section observed with a microscope changes along the helical axis. In FIG. 4, a state in which the molecular axis 40A is orthogonal to the cross section observed with the microscope is shown by a shape in which a major axis of the ellipse showing the rod-like liquid crystal compound 40 is short, and a state in which the molecular axis 40A is parallel to the cross section observed with a microscope is shown by a shape in which a major axis of the ellipse showing the rod-like liquid crystal compound 40 is long.

As shown in FIG. 4, by arranging the molecules of the rod-like liquid crystal compound 40, a region where the orientation of the molecular axis 40A of the rod-like liquid crystal compound 40 is parallel to the cross section observed with a microscope (that is, a region where the major axis of the ellipse showing the rod-like liquid crystal compound 40 is shown as a long shape) is observed as the dark portion. For the same reason, a region where the orientation of the molecular axis 40A of the rod-like liquid crystal compound 40 is orthogonal to the cross section observed with a microscope (that is, a region where the major axis of the ellipse showing the rod-like liquid crystal compound 40 is shown as a short shape) is observed as the bright portions.

Therefore, since the molecules of the rod-like liquid crystal compound 40 are arranged as shown in FIG. 4, the cross-sectional stripe pattern as shown in FIG. 3 can be seen by the microscopic observation.

In the cholesteric liquid crystal film 1 shown in FIG. 4, the helical axis HA is orthogonal to the molecular axis 40A of the rod-like liquid crystal compound 40, and is inclined with respect to the main surfaces Fa and Fb of the cholesteric liquid crystal film 1.

Since the helical axis HA is inclined in this way, the dark portions in the cross-sectional stripe pattern is inclined with respect to the main surface, as will be described later.

An inclined angle of the helical axis HA with respect to the main surfaces Fa and Fb is orthogonal to an inclined angle of the dark portions with respect to the main surface in the cross-sectional stripe pattern.

Here, the molecular arrangement of the liquid crystal compound in the cholesteric liquid crystal film in a case where the bright portions and the dark portions are seen in the microscopic observation of the cross section in the thickness direction has been described, but the reason why the bright portions and the dark portions are seen in the microscopic observation from the upper surface is the same.

(Preferred Aspect of Cross-Sectional Stripe Pattern)

The dark portions in the cross-sectional stripe pattern is preferably inclined with respect to the main surface.

That is, it is preferable that the dark portions in the cross-sectional stripe pattern is inclined with respect to the main surface (front surface or back surface) of the cholesteric liquid crystal film. More specifically with reference to FIG. 3, it is preferable that the dark portions 10 in the cross-sectional stripe pattern is inclined with respect to the main surfaces Fa and Fb. Since the dark portions are inclined, it is easy to obtain an aspect having the linear stripe pattern on the upper surface observed with a microscope.

In the present disclosure, the aspect that "the dark portions are inclined with respect to the main surface" means that the dark portions and the main surface are not parallel as seen by the microscopic observation of the cross section in the thickness direction.

More specifically, the inclined angle of the dark portions with respect to the main surface in the cross-sectional stripe pattern is preferably 20° to 90°, more preferably 30° to 90°, and still more preferably 40° to 90°.

The inclined angle of the dark portions with respect to the main surface in the cross-sectional stripe pattern is obtained by the following method.

In the microscopic observation of the cross section in the thickness direction, an angle θ (specifically, θ shown in FIG. 3) formed by a straight line passing through the central portion in the width direction at both ends in the longitudinal direction of one dark portion and the main surface is measured. Unless the angle at the intersection is 90°, a smaller angle (that is, an acute angle) at the intersection is defined as the inclined angle. This measurement is performed for 10 dark portions, and an arithmetic mean value of the obtained measured values for the 10 dark portions is defined as the inclined angle of the dark portions with respect to the main surface.

A distance between adjacent dark portions in the cross-sectional stripe pattern is preferably 0.01 μm to 50 μm, more preferably 0.05 μm to 10 μm, and still more preferably 0.1 μm to 5 μm.

The distance between adjacent dark portions in the cross-sectional stripe pattern is obtained by the same method as the "distance between adjacent dark portions" in the linear stripe pattern.

[Components Included in Cholesteric Liquid Crystal Film]

Hereinafter, components included in the cholesteric liquid crystal film according to the embodiment of the present disclosure will be described.

The cholesteric liquid crystal film according to the embodiment of the present disclosure includes a liquid crystal compound forming the cholesteric liquid crystal.

In addition, the cholesteric liquid crystal film according to the embodiment of the present disclosure may include other components (for example, a chiral agent, a solvent, an alignment restriction agent, a polymerization initiator, a leveling agent, an alignment assistant, a sensitizer, and the like) as necessary.

(Liquid Crystal Compound)

The liquid crystal compound included in the cholesteric liquid crystal film according to the embodiment of the present disclosure is not particularly limited. As the liquid crystal compound, for example, a known liquid crystal compound which forms a cholesteric liquid crystal can be used.

The liquid crystal compound may have a polymerizable group. The liquid crystal compound may have one kind alone or two or more kinds of the polymerizable groups. In a case where the liquid crystal compound has a polymerizable group, the liquid crystal compound can be polymerized. By polymerizing the liquid crystal compound, stability of the cholesteric liquid crystal can be improved.

Examples of the polymerizable group include a group having an ethylenically unsaturated double bond, a cyclic ether group, and a nitrogen-containing heterocyclic group capable of causing a ring-opening reaction.

Examples of the group having an ethylenically unsaturated double bond include an acryloyl group, a methacryloyl group, an acryloyloxy group, a methacryloyloxy group, a vinyl group, a vinylphenyl group, and an allyl group.

Examples of the cyclic ether group include an epoxy group and an oxetanyl group.

Examples of the nitrogen-containing heterocyclic group capable of causing a ring-opening reaction include an aziridinyl group.

The polymerizable group is preferably at least one selected from the group consisting of a group having an ethylenically unsaturated double bond and a cyclic ether group. Specifically, the polymerizable group is preferably at least one selected from the group consisting of an acryloyl group, a methacryloyl group, an acryloyloxy group, a methacryloyloxy group, a vinyl group, a vinylphenyl group, an allyl group, an epoxy group, an oxetanyl group, and an aziridinyl group, more preferably at least one selected from the group consisting of an acryloyl group, a methacryloyl group, an acryloyloxy group, and a methacryloyloxy group, and particularly preferably at least one selected from the group consisting of an acryloyloxy group and a methacryloyloxy group.

The liquid crystal compound is classified into, for example, a rod-like liquid crystal compound and a disk-like liquid crystal compound according to a chemical structure. The rod-like liquid crystal compound is known as a liquid crystal compound having a rod-like chemical structure. As the rod-like liquid crystal compound, for example, a known rod-like liquid crystal compound can be used. The disk-like liquid crystal compound is known as a liquid crystal compound having a disk-like chemical structure. As the disk-like liquid crystal compound, for example, a known disk-like liquid crystal compound can be used.

From the viewpoint of adjusting optical characteristics (particularly, diffraction characteristics of light) of the cholesteric liquid crystal film, the liquid crystal compound is preferably a rod-like liquid crystal compound, and more preferably a rod-like thermotropic liquid crystal compound.

The rod-like thermotropic liquid crystal compound is a compound which has a rod-like chemical structure and exhibits liquid crystallinity in a specific temperature range. As the rod-like thermotropic liquid crystal compound, for example, a known rod-like thermotropic liquid crystal compound can be used.

Examples of the rod-like thermotropic liquid crystal compound include compounds described in Makromol. Chem., vol. 190, p. 2255 (1989), Advanced Materials, vol. 5, p. 107 (1993), U.S. Pat. Nos. 4,683,327A, 5,622,648A, 5,770,107A, WO1995/22586A, WO1995/24455A, WO1997/00600A, WO1998/23580A, WO1998/52905A, JP1989-272551A (JP-H1-272551A), JP1994-16616A (JP-H6-16616A), JP1995-110469A (JP-H7-110469A), JP1999-

513019B (JP-H11-513019B), JP1999-80081A (JP-H11-80081A), JP2001-328973A, and JP2007-279688A. Examples of the rod-like thermotropic liquid crystal compound also include the liquid crystal compound represented by General Formula 1 in JP2016-81035A and the compound represented by General Formula (I) or General Formula (II) in JP2007-279688A.

The rod-like thermotropic liquid crystal compound is preferably a compound represented by General Formula (1).

$$Q^1\text{-}L^1\text{-}A^1\text{-}L^3\text{-}M\text{-}L^4\text{-}A^2\text{-}L^2\text{-}Q^2 \quad (1)$$

In General Formula (1), $Q^1$ and $Q^2$ each independently represent a polymerizable group, $L^1$, $L^2$, $L^3$, and $L^4$ each independently represent a single bond or a divalent linking group, $A^1$ and $A^2$ each independently represent a divalent hydrocarbon group having 2 to 20 carbon atoms, and M represents a mesogen group.

Examples of the polymerizable group represented $Q^1$ and $Q^2$ in General Formula (1) include the above-described polymerizable group. Preferred aspects of the polymerizable group represented by $Q^1$ and $Q^2$ are the same as those of the polymerizable group described above.

As the divalent linking group represented by $L^1$, $L^2$, $L^3$, and $L^4$ in General Formula (1), a divalent linking group selected from the group consisting of —O—, —S—, —CO—, —NR—, —CO—O—, —O—CO—O—, —CO—NR—, —NR—CO—, —O—CO—, —O—CO—NR—, —NR—CO—O—, and NR—CO—NR— is preferable. R in the above-described divalent linking group represents an alkyl group having 1 to 7 carbon atoms or a hydrogen atom.

In General Formula (1), at least one of $L^3$ or $L^4$ is preferably —O—CO—O—.

In General Formula (1), $Q^1$-$L^1$- and $Q^2$-$L^2$- are each independently preferably $CH_2$=CH—CO—O—, $CH_2$=C($CH_3$)—CO—O—, or $CH_2$=C(Cl)—CO—O—, and more preferably $CH_2$=CH—CO—O—.

The divalent hydrocarbon group represented by $A^1$ and $A^2$ in General Formula (1) is preferably an alkylene group having 2 to 12 carbon atoms, an alkenylene group having 2 to 12 carbon atoms, or an alkynylene group having 2 to 12 carbon atoms, and more preferably an alkylene group having 2 to 12 carbon atoms. The divalent hydrocarbon group is preferably in a form of a chain. The divalent hydrocarbon group may include oxygen atoms which are not adjacent to each other or sulfur atoms which are not adjacent to each other. The divalent hydrocarbon group may have a substituent. Examples of the substituent include a halogen atom (for example, fluorine, chlorine, and bromine), a cyano group, a methyl group, and an ethyl group.

The mesogen group represented by M in General Formula (1) is a group which forms a main skeleton of the liquid crystal compound and contributes to the formation of the liquid crystal. With regard to the mesogen group represented by M, the description of "Flussige Kristalle in Tabellen II" (VEB Deutscher Verlag fur Grundstoff Industrie, Leipzig, 1984) (particularly, pp. 7 to 16) and the description of "Liquid Crystal Handbook" (edited by Liquid Crystals Handbook Editing Committee, Maruzen, 2000) (particularly, section 3) can be referred to.

Examples of a specific structure of the mesogen group represented by M in General Formula (1) include the structure described in paragraph [0086] of JP2007-279688A.

The mesogen group represented by M in General Formula (1) is preferably a group including at least one cyclic structure selected from the group consisting of an aromatic hydrocarbon group, a heterocyclic group, and an alicyclic hydrocarbon group, and more preferably a group including an aromatic hydrocarbon group.

The mesogen group represented by M in General Formula (1) is preferably a group including 2 to 5 aromatic hydrocarbon groups, and more preferably a group including 3 to 5 aromatic hydrocarbon groups.

The mesogen group represented by M in General Formula (1) is preferably a group which includes 3 to 5 phenylene groups and in which the phenylene groups are linked to each other by —CO—O—.

The cyclic structure (for example, an aromatic hydrocarbon group, a heterocyclic group, and an alicyclic hydrocarbon group) included in the mesogen group represented by M in General Formula (1) may have a substituent. Examples of the substituent include an alkyl group having 1 to 10 carbon atoms (for example, a methyl group).

Specific examples of the compound represented by General Formula (1) are as follows. However, the compound represented by General Formula (1) is not limited to the compounds shown below. In the chemical structure of the compounds shown below, "-Me" represents a methyl group.

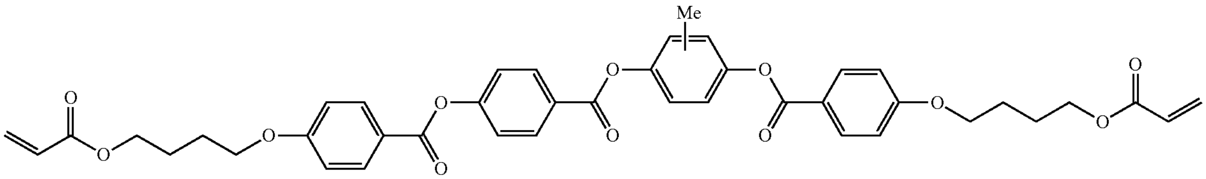

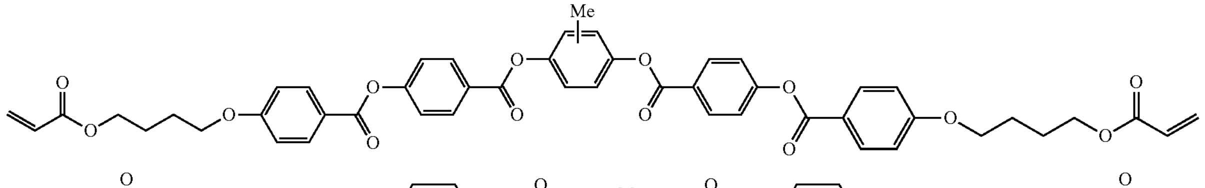

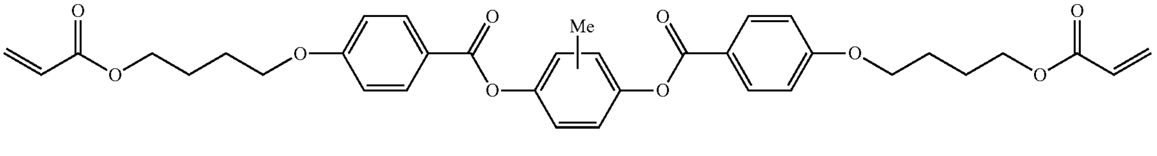

Specific examples of the rod-like thermotropic liquid crystal compound are shown below. However, the rod-like thermotropic liquid crystal compound is not limited to the compounds shown below.

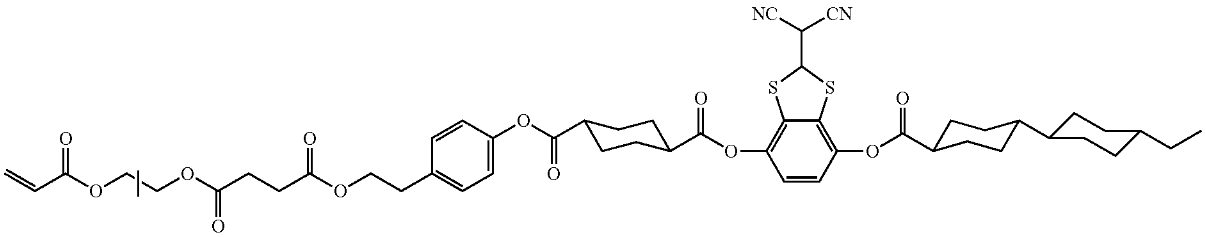

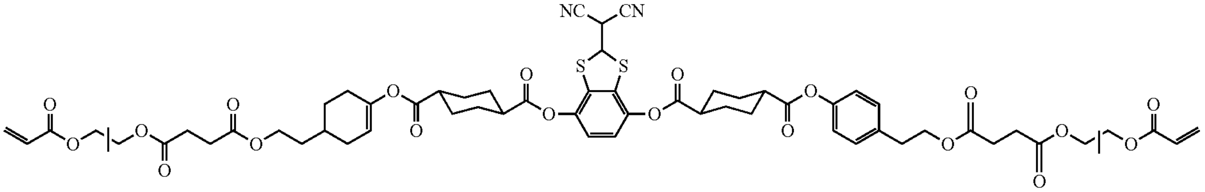

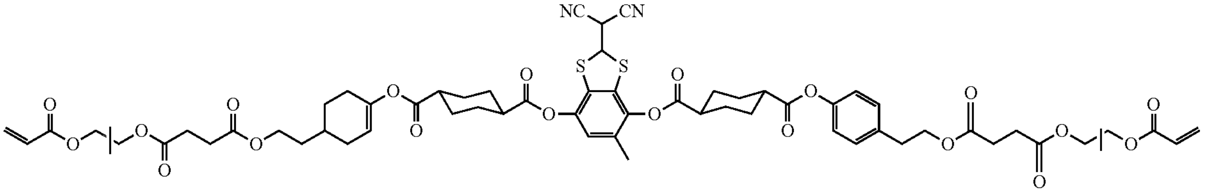

The liquid crystal compound may be a synthetic product synthesized by a known method or a commercially available product.

The commercially available product of the liquid crystal compound is available from, for example, Tokyo Chemical Industry Co., Ltd. and FUJIFILM Wako Pure Chemical Corporation.

From the viewpoint of heat resistance, a content of the liquid crystal compound is preferably 70% by mass or more, more preferably 80% by mass or more, and particularly preferably 90% by mass or more with respect to the total mass of the cholesteric liquid crystal film. The upper limit of the content of the liquid crystal compound is not limited. The content of the liquid crystal compound may be determined in a range of 100% by mass or less with respect to the total mass of the cholesteric liquid crystal film. In a case where the cholesteric liquid crystal film includes a component other than the liquid crystal compound, a content of the liquid crystal compound may be determined in a range of less than 100% by mass (preferably 98% by mass or less or 95% by mass or less) with respect to the total mass of the cholesteric liquid crystal film.

For example, the content of the liquid crystal compound is preferably 70% by mass or more and less than 100% by mass, more preferably 80% by mass to 98% by mass, and particularly preferably 90% by mass to 95% by mass with respect to the total mass of the cholesteric liquid crystal film.

(Other Components)

The cholesteric liquid crystal film may include a component other than the liquid crystal compound (hereinafter, referred to as "other components" in this paragraph). Examples of the other components include a chiral agent, a solvent, an alignment restriction agent, a polymerization initiator, a leveling agent, an alignment assistant, and a sensitizer.

[Film Thickness of Cholesteric Liquid Crystal Film]

A film thickness of the cholesteric liquid crystal film is not particularly limited, and may be determined according to the application.

From the viewpoint of film hardness, the film thickness of the cholesteric liquid crystal film is preferably 0.5 μm or more, more preferably 1 μm or more, and particularly preferably 2 μm or more.

From the viewpoint of alignment accuracy, the film thickness of the cholesteric liquid crystal film is preferably 30 μm or less, more preferably 25 μm or less, and particularly preferably 20 μm or less.

For example, the film thickness of the cholesteric liquid crystal film is preferably 0.5 μm to 30 μm, more preferably 1 μm to 25 μm, and particularly preferably 2 μm to 20 μm.

The film thickness of the cholesteric liquid crystal film is determined by the following method.

In the microscopic observation of the cross section in the thickness direction, film thicknesses at five points are measured.

An arithmetic mean value of the measured values is defined as the film thickness of the cholesteric liquid crystal film.

[Other Layers]

The cholesteric liquid crystal film according to the embodiment of the present disclosure may have a laminated structure together with a layer other than the cholesteric liquid crystal film, in addition to the cholesteric liquid crystal film.

The types of other layers are not limited within a range not departing from the scope of the present disclosure. Examples of the other layers include a substrate and an alignment layer.

(Substrate)

The cholesteric liquid crystal film according to the embodiment of the present disclosure may have a laminated structure together with a substrate.

The substrate is preferably a resin substrate.

Examples of the resin substrate include a polyester-based substrate (for example, polyethylene terephthalate and polyethylene naphthalate), a cellulose-based substrate (for example, diacetyl cellulose and triacetyl cellulose (abbreviation: TAC)), a polycarbonate-based substrate, a poly (meth)acrylic substrate (for example, poly(meth)acrylate (such as polymethylmethacrylate)), a polystyrene-based substrate (for example, polystyrene and an acrylonitrile-styrene copolymer), an olefin-based substrate (for example, polyethylene, polypropylene, polyolefin having a cyclic structure (for example, a norbornene structure), and an ethylene-propylene copolymer), a polyamide-based substrate (for example, polyvinyl chloride, nylon, and aromatic polyamide), a polyimide-based substrate, a polysulfone-based substrate, a polyether sulfone-based substrate, a polyetheretherketone-based substrate, a polyphenylene sulfide-based substrate, a vinyl alcohol-based substrate, a polyvinylidene chloride-based substrate, a polyvinyl butyral-based substrate, a polyoxymethylene-based substrate, and an epoxy resin-based substrate. The substrate may be a substrate including two or more kinds of resins (that is, a blend polymer). The substrate is preferably a cellulose-based substrate, and more preferably a substrate including triacetyl cellulose.

From the viewpoint of manufacturing suitability, manufacturing cost, and optical characteristics, a thickness of the substrate is preferably in a range of 30 μm to 150 μm, and more preferably 40 μm to 100 μm.

(Alignment Layer)

The cholesteric liquid crystal film according to the embodiment of the present disclosure may have a laminated structure in which an alignment layer is provided between the substrate and the cholesteric liquid crystal film.

As the alignment layer, for example, a known alignment layer having a function of applying the alignment restriction force to the liquid crystal compound can be used. The alignment layer may be an alignment layer in which the alignment function is generated by applying an electric field, applying a magnetic field, or irradiating light.

A film thickness of the alignment layer is preferably in a range of 0.1 μm to 10 μm, and more preferably in a range of 1 μm to 5 μm.

Examples of a method for forming the alignment layer include a rubbing treatment of an organic compound (preferably, a polymer), an orthorhombic deposition of an inorganic compound, and a formation of a layer having a microgroove.

[Application]

The cholesteric liquid crystal film according to the embodiment of the present disclosure is expected to be applied to a diffraction grating, a polarizer, an antireflection film, and the like.

<Manufacturing Method of Cholesteric Liquid Crystal Film>

A manufacturing method of the cholesteric liquid crystal film according to the embodiment of the present disclosure is not limited as long as a method capable of manufacturing a cholesteric liquid crystal film that a stripe pattern in which dark portions and bright portions are alternately arranged and that a folded structure due to the dark portions can be seen on a surface layer portion of one main surface of a pair of main surfaces by microscopic observation of a cross section in a thickness direction, as described above.

Hereinafter, an example of the manufacturing method of the cholesteric liquid crystal film according to the embodiment of the present disclosure will be described, but the present invention is not limited to this manufacturing method.

The manufacturing method of the cholesteric liquid crystal film according to the embodiment of the present disclosure includes a first step of applying a coating liquid including a solvent, a liquid crystal compound, and a chiral agent onto a substrate to form a coating film and a second step of applying a shearing force to a surface of the formed coating film with a blade, in which a shear rate in the second step is 1000 seconds$^{-1}$ or more.

Hereinafter, each step will be specifically described.

[First Step]

In the first step, a coating liquid including a solvent, a liquid crystal compound, and a chiral agent is applied onto a substrate to form a coating film.

(Substrate)

Examples of the substrate used in the first step include the substrate described in the above section of "Substrate". Preferred aspects of the substrate used in the first step are the same as the substrate described in the above section of "Substrate". An alignment layer may be disposed in advance on a surface of the substrate used in the first step.

(Liquid Crystal Compound)

As the liquid crystal compound included in the coating liquid used in the first step, for example, the liquid crystal compound described in the above section of "Liquid crystal compound" can be used. Preferred aspects of the liquid crystal compound included in the coating liquid are the same as the liquid crystal compound described in the above section of "Liquid crystal compound".

The coating liquid may include one kind alone or two or more kinds of the liquid crystal compounds.

A content of the liquid crystal compound is preferably 70% by mass or more, more preferably 80% by mass or more, and particularly preferably 90% by mass or more with respect to the mass of solid content of the coating liquid. The upper limit of the content of the liquid crystal compound may be determined according to the content of components other than the liquid crystal compound. The content of the liquid crystal compound may be determined in a range of less than 100% by mass (preferably 98% by mass or less or 95% by mass or less) with respect to the mass of the solid content of the coating liquid.

(Chiral Agent)

The type of the chiral agent is not limited.

As the chiral agent, for example, a known chiral agent (for example, chiral agents described in "Liquid Crystal Device Handbook, chapter 3, section 4-3, chiral agents for TN and STN, page 199, Japan Society for the Promotion of Science edited by the 142nd committee, 1989" can be used.

Many chiral agents include an asymmetric carbon atom. However, the chiral agent is not limited to compounds including an asymmetric carbon atom. Examples of the chiral agent include an axial asymmetric compound not including an asymmetric carbon atom and a planar asymmetric compound. Examples of the axial asymmetric compound or the planar asymmetric compound include binaphthyl, helicene, paracyclophane, and derivatives thereof.

The chiral agent may have a polymerizable group. For example, by a reaction of the chiral agent having a polymerizable group and the liquid crystal compound having a polymerizable group, a polymer having a structural unit derived from the chiral agent and a structural unit derived from the liquid crystal compound is obtained.

Examples of the polymerizable group in the chiral agent include the polymerizable group described in the above section of "Liquid crystal compound". Preferred aspects of the polymerizable group in the chiral agent are the same as those of the polymerizable group described in the above section of "Liquid crystal compound". The type of the polymerizable group in the chiral agent is preferably the same as the type of the polymerizable group in the liquid crystal compound.

Examples of a chiral agent exhibiting a strong twisting force include chiral agents described in JP2010-181852A, JP2003-287623A, JP2002-80851A, JP2002-80478A, and JP2002-302487A. For isosorbide compounds described in the above-mentioned documents, isomannide compounds having the corresponding structure can also be used as the chiral agent. In addition, for isomannide compounds described in the above-mentioned documents, isosorbide compounds having the corresponding structure can also be used as the chiral agent.

A content of the chiral agent is preferably 0.5% by mass to 10.0% by mass, more preferably 0.8% by mass to 3.0% by mass, and particularly preferably 1.0% by mass to 3.0% by mass with respect to the mass of solid content of the coating liquid.

(Solvent)

As the solvent, an organic solvent is preferable. Examples of the organic solvent include an amide solvent (for example, N,N-dimethylformamide), a sulfoxide solvent (for example, dimethyl sulfoxide), a heterocyclic compound (for example, pyridine), a hydrocarbon solvent (for example, benzene and hexane), an alkyl halide solvent (for example, chloroform and dichloromethane), an ester solvent (for example, methyl acetate and butyl acetate), a ketone solvent (for example, acetone, methyl ethyl ketone, and cyclohexanone), and an ether solvent (for example, tetrahydrofuran and 1,2-dimethoxyethane). The organic solvent is preferably at least one selected from the group consisting of an alkyl halide solvent and a ketone solvent, and more preferably a ketone solvent.

The coating liquid may include one kind alone or two or more kinds of the solvents.

A content of solid content in the coating liquid is preferably 25% by mass to 40% by mass and more preferably 25% by mass to 35% by mass with respect to the total mass of the coating liquid.

(Other Components)

The coating liquid used in the first step may include a component other than the above-described components. Examples of the other components include an alignment restriction agent, a polymerization initiator, a leveling agent, an alignment assistant, and a sensitizer.

—Alignment Restriction Agent—

Examples of the alignment restriction agent include compounds described paragraphs [0012] to [0030] of JP2012-211306A, compounds described in paragraphs [0037] to [0044] of JP2012-101999A, fluorine-containing (meth)acrylate polymers described in paragraphs [0018] to [0043] of JP2007-272185A, and compounds described in detail in JP2005-099258A together with a synthesis method. A polymer including a polymerization unit of a fluoroaliphatic group-containing monomer in an amount of more than 50% by mass of the total polymerization unit, which is described in JP2004-331812A, may be used as the alignment restriction agent.

Examples of the alignment restriction agent also include a vertical alignment agent. Examples of the vertical alignment agent include a boronic acid compound and/or onium salt described in JP2015-38598A and an onium salt described in JP2008-26730A.

A content of the alignment restriction agent is preferably more than 0% by mass and 5.0% by mass or less, and more preferably 0.3% by mass to 2.0% by mass with respect to the mass of solid content of the coating liquid.

—Polymerization Initiator—

Examples of the polymerization initiator include a photopolymerization initiator and a thermal polymerization initiator.

From the viewpoint of suppressing deformation of the substrate due to heat and deterioration of the coating liquid, the polymerization initiator is preferably a photopolymerization initiator. Examples of the photopolymerization initiator include α-carbonyl compounds (for example, compounds described in U.S. Pat. Nos. 2,367,661A and 2,367,670A), acyloin ethers (for example, compounds described in U.S. Pat. No. 2,448,828A), α-hydrocarbon-substituted aromatic acyloin compounds (for example, compounds described in U.S. Pat. No. 2,722,512A), polynuclear quinone compounds (for example, compounds described in U.S. Pat. Nos. 3,046,127A and 2,951,758A), combinations of a triarylimidazole dimer and a p-aminophenylketone (for example, compounds described in U.S. Pat. No. 3,549,367A), acridine compounds (for example, compounds described in JP1985-105667A (JP-S60-105667A) and U.S. Pat. No. 4,239,850A), phenazine compounds (for example, compounds described in JP1985-105667A (JP-S60-105567A) and U.S. Pat. No. 4,239,850A), oxadiazole compounds (for example, compounds described in U.S. Pat. No. 4,212,970A), and acylphosphine oxide compounds (for example, compounds described in JP1988-40799B (JP-S63-40799B), JP1993-29234B (JP-H5-29234B), JP1998-95788A (JP-H10-95788A), and JP1998-29997A (JP-H10-29997A)).

A content of the polymerization initiator is preferably 0.5% by mass to 5.0% by mass, and more preferably 1.0% by mass to 4.0% by mass with respect to the mass of solid content of the coating liquid.

(Preparation Method of Coating Liquid)

A preparation method of the coating liquid used in the first step is not limited.

Examples of the preparation method of the coating liquid include a method of mixing the above-described components. As the mixing method, a known mixing method can be used. In the preparation method of the coating liquid, a mixture obtained by mixing the above-described respective components may be filtered.

[Applying Method]

An applying method of the coating liquid is not limited.

Examples of the applying method of the coating liquid include an extrusion die coater method, a curtain coating method, a dip coating method, a spin coating method, a printing coating method, a spray coating method, a slot coating method, a roll coating method, a slide coating method, a blade coating method, a gravure coating method, and a wire bar coating method.

[Thickness of Coating Film]

A thickness of the coating film (that is, an applying amount of the coating liquid) is not limited.

The thickness of the coating film may be determined, for example, depending on the target thickness of the cholesteric liquid crystal film or the thickness of the coating film before applying the shearing force described in the section of "Second step" below.

[Second Step]

In the second step, a shearing force is applied to a surface of the coating film formed in the first step with a blade. A shear rate in the second step is 1000 $seconds^{-1}$ or more.

(Applying Shearing Force with Blade)

In the method of applying the shearing force to the surface of the coating film using a blade, it is preferable to scrape the surface of the coating film with the blade. In the above-described method, the thickness of the coating film may change before and after applying the shearing force. The thickness of the coating film after applying the shearing force with the blade may be ½ or less or ⅓ or less of the thickness of the coating film before applying the shearing force. The thickness of the coating film after applying the shearing force with the blade is preferably ¼ or more of the thickness of the coating film before applying the shearing force.

A material of the blade is not limited. Examples of the material of the blade include metals (for example, stainless steel) and resins (for example, TEFLON (registered trademark) and polyetheretherketone (PEEK)).

A shape of the blade is not limited. Examples of the shape of the blade include a plate shape.

From the viewpoint of easily applying the shearing force to the coating film, the blade is preferably a metal plate-shaped member.

From the viewpoint of easily applying the shearing force to the coating film, a thickness of a tip part of the blade in contact with the coating film is preferably 0.1 mm or more and more preferably 1 mm or more. The upper limit of the thickness of the blade is not limited. The thickness of the blade may be determined, for example, in a range of 10 mm or less.

(Shear Rate)

The shear rate in the second step is 1000 $seconds^{-1}$ or more, more preferably 10000 $seconds^{-1}$ or more and particularly preferably 30000 $seconds^{-1}$ or more. The upper limit of the shear rate is not limited. The shear rate may be determined, for example, in a range of $1.0\times10^6$ $seconds^{-1}$ or less.

Hereinafter, how to obtain the shear rate will be described. For example, in a case where the shearing force is applied using a blade, the shear rate is determined by "V/d" in a case where the shortest distance between the blade and the substrate is defined as "d" and a transportation speed of the coating film in contact with the blade (that is, a relative speed between the coating film and the blade) is defined as "V".

(Surface Temperature of Coating Film)

A surface temperature of the coating film in a case of applying the shearing force may be determined according to a phase transition temperature of the liquid crystal compound included in the coating film. The surface temperature of the coating film to which the shearing force is applied is preferably 50° C. to 120° C. and more preferably 60° C. to 100° C. By adjusting the surface temperature of the coating film within the above-described range, a cholesteric liquid crystal film having high alignment accuracy can be obtained. The surface temperature of the coating film is measured using a radiation thermometer in which emissivity is calibrated by a temperature value measured by a noncontact thermometer. The surface temperature of the coating film is measured within 10 cm from the surface on the side (that is, a back side) opposite to the measurement surface without any reflector.

(Thickness of Coating Film)

From the viewpoint of forming a cholesteric liquid crystal film having high alignment accuracy, a thickness of the coating film before applying the shearing force is preferably 30 μm or less and more preferably in a range of 10 μm to 25 μm.

From the viewpoint of forming a cholesteric liquid crystal film having high alignment accuracy, the thickness of the coating film after applying the shearing force is preferably 10 μm or less and more preferably 8 μm or less. The lower limit of the thickness of the coating film after applying the shearing force is not limited. The thickness of the coating film after applying the shearing force is preferably in a range of 5 μm or more.

[Third Step]

The manufacturing method of the cholesteric liquid crystal film according to the embodiment of the present disclosure preferably includes, between the first step and the second step, a third step of adjusting the content of the solvent in the applied coating film to a range of 50% by mass or less with respect to the total mass of the coating film.

By adjusting the content of the solvent in the coating film to the range of 50% by mass or less, a cholesteric liquid crystal film having high alignment accuracy can be formed.

In the third step, the content of the solvent in the coating film is preferably 40% by mass or less and more preferably 30% by mass or less with respect to the total mass of the coating film. The lower limit of the content of the solvent in the coating film is not limited. The content of the solvent in the coating film may be 0% by mass or more than 0% by mass with respect to the total mass of the above-described coating film. From the viewpoint that it is easy to suppress deterioration of a surface condition of the applied coating film, the content of the solvent in the applied coating film may be 10% by mass or more.

The content of the solvent in the coating film is measured by an absolute dry method. Hereinafter, a specific procedure of the measuring method will be described. After drying a sample collected from the coating film at 60° C. for 24 hours, a mass change of the sample before and after drying (that is, a difference between the mass of the sample after drying and the mass of the sample before drying) is determined. An arithmetic mean of the values obtained by performing the above-described operation three times is defined as the content of the solvent.

In the third step, examples of a method for adjusting the content of the solvent in the coating film include drying.

As a unit for drying the coating film, a known drying unit can be used. Examples of the drying unit include an oven, a hot air blower, and an infrared (IR) heater.

In the drying using a hot air blower, a hot air may be blown directly onto the coating film, or a hot air may be blown onto the surface opposite to the surface on which the coating film of the substrate is disposed. In addition, a diffusion plate may be installed in order to prevent the surface of the coating film from flowing due to the hot air.

The drying may be performed by inhalation. For the drying by inhalation, for example, a decompression chamber having a discharge mechanism can be used. By inhaling gas around the coating film, the content of the solvent in the coating film can be reduced.

The drying conditions are not limited as long as the content of the solvent in the coating film can be adjusted to the range of 50% by mass or less. The drying conditions may be determined, for example, according to the components included in the coating film, the applying amount of the coating film, and the transportation speed.

[Fourth Step]

In a case where the coating liquid includes a polymerizable compound (for example, a liquid crystal compound having a polymerizable group or a chiral agent having a polymerizable group), the manufacturing method of the cholesteric liquid crystal film according to the embodiment of the present disclosure preferably includes, after the second step, a fourth step of curing the coating film to which the shearing force is applied.

By curing the coating film in the fourth step, the molecular arrangement of the liquid crystal compound can be fixed.

Examples of a method for curing the coating film include heating and irradiation with active energy ray. In the fourth step, from the viewpoint of manufacturing suitability, it is preferable to cure the coating film by irradiating the coating film to which the shearing force is applied with active energy ray.

Examples of the active energy ray include α rays, γ rays, X-rays, ultraviolet rays, infrared rays, visible light rays, and electron beam. From the viewpoint of curing sensitivity and availability of equipment, the active energy ray is preferably ultraviolet rays.

Examples of a light source of ultraviolet rays include lamps (for example, a tungsten lamp, a halogen lamp, a xenon lamp, a xenon flash lamp, a mercury lamp, a mercury-xenon lamp, and a carbon arc lamp), lasers (for example, semiconductor laser, helium neon laser, argon ion laser, helium cadmium laser, and Yttrium Aluminum Garnet (YAG) laser), light emitting diodes, and cathode ray tube.

A peak wavelength of the ultraviolet rays emitted from the light source of ultraviolet rays is preferably 200 nm to 400 nm.

An exposure amount (also referred to as an integrated light amount) of ultraviolet rays is preferably 100 $mJ/cm^2$ to 500 $mJ/cm^2$.

[Other Steps]

The manufacturing method of the cholesteric liquid crystal film according to the embodiment of the present disclosure may include a step other than the above-described steps.

For example, the manufacturing method of the cholesteric liquid crystal film according to the embodiment of the present disclosure may include a step of forming an alignment layer on the substrate. The step of forming the alignment layer on the substrate is preferably performed before the first step.

The manufacturing method of the cholesteric liquid crystal film according to the embodiment of the present disclosure may be performed by a roll-to-roll system. In the roll-to-roll system, for example, each step is carried out while continuously transporting a long substrate. The manufacturing method of the cholesteric liquid crystal film according to the embodiment of the present disclosure may be performed using a substrate which is conveyed one by one.

Figure 5:
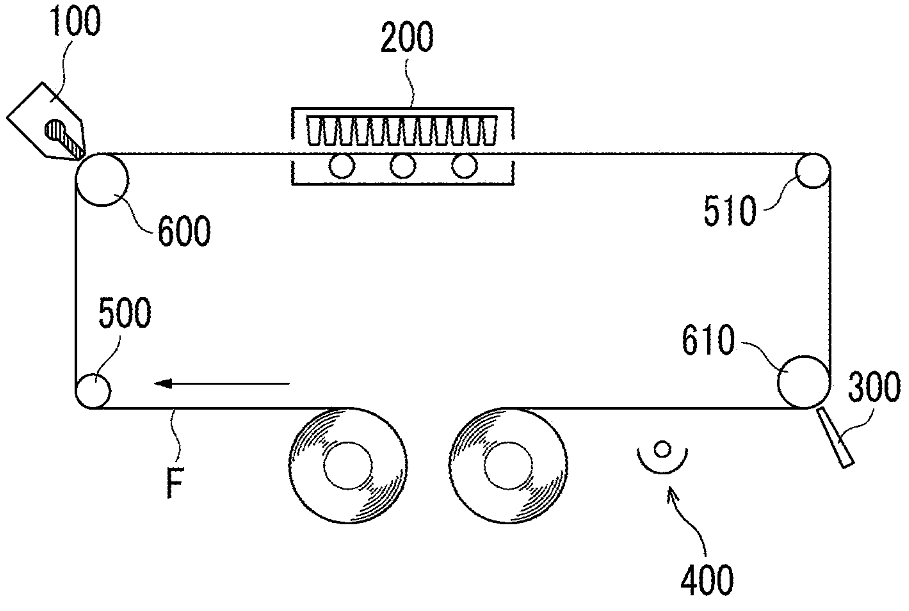
FIG. 5 is a schematic diagram showing an example of a manufacturing method of the cholesteric liquid crystal film according to the embodiment of the present disclosure.

The manufacturing method of the cholesteric liquid crystal film according to the embodiment of the present disclosure will be described with reference to FIG. 5. FIG. 5 is a schematic diagram showing an example of the manufacturing method of the cholesteric liquid crystal film according to the embodiment of the present disclosure.

In FIG. 5, the cholesteric liquid crystal film is manufactured by a roll-to-roll system. A long substrate F wound in a roll shape is conveyed in a direction of the arrow by a transport roll 500. A transportation speed of the substrate F is preferably 10 m/min to 100 m/min.

A coating liquid is applied onto the substrate F which has passed through the transport roll 500 by an application device 100 (first step).

The coating liquid includes a liquid crystal compound, a chiral agent, and a solvent.

The coating liquid is applied by the application device 100 in a region where the substrate F is wound on a backup roll 600. Hereinafter, preferred aspects of the backup roll 600 will be described.

A surface of the backup roll 600 may be, for example, hard chrome plated. A thickness of the plating is preferably 40 μm to 60 μm.

A surface roughness Ra of the backup roll 600 is preferably 0.1 μm or less.

A surface temperature of the backup roll 600 may be controlled in an arbitrary temperature range by a temperature controller. The surface temperature of the backup roll 600 may be determined according to the composition of the coating liquid, the curing performance of the coating liquid, and the heat resistance of the substrate. The surface temperature of the backup roll 600 is, for example, preferably 40° C. to 120° C. and more preferably 40° C. to 100° C. Examples of the temperature controller of the backup roll 600 include a heating unit and a cooling unit. Examples of the heating unit include induction heating, water heating, and oil heating. Examples of the cooling unit include cooling with cooling water.

A diameter of the backup roll 600 is preferably 100 mm to 1,000 mm, more preferably 100 mm to 800 mm, and particularly preferably 200 mm to 700 mm.

A wrap angle of the substrate F with respect to the backup roll 600 is preferably 60° or more, and more preferably 90° or more. In addition, the upper limit of the wrap angle can be set to, for example, 180°. The "wrap angle" means an angle formed by a transport direction of the substrate in a case where the substrate comes into contact with the backup roll and a transport direction of the substrate in a case where the substrate is separated from the backup roll.

The coating liquid is applied onto the substrate F by the application device 100 to form a coating film, and then the coating film is dried by a drying device 200 (third step).

By drying the coating film, the content of the solvent in the coating film is adjusted.

After the coating film is dried by the drying device 200, the upper surface of the coating film which passes through a transport roll 510 is scraped off by using a blade 300 to apply a shearing force to the surface of the coating film (second step).

The shearing force is applied along the transport direction of the coating film (that is, the transport direction of the substrate). The application of the shearing force with the blade 300 is performed in a region where the substrate F is wound on a backup roll 610.

Preferred aspects of the backup roll 610 are the same as that of the backup roll 600. The surface temperature of the backup roll 610 is, for example, preferably 50° C. to 120° C. and more preferably 60° C. to 100° C.

After applying the shearing force to the coating film, the coating film is cured by irradiating the coating film with active energy ray from a light source 400 (fourth step).

By curing the coating film, a cholesteric liquid crystal film is formed on the substrate.

EXAMPLES

Hereinafter, the present disclosure will be described in detail according to Examples. However, the present disclosure is not limited to the following Examples.

Example 1

[Preparation of Substrate]

As the substrate, a long triacetyl cellulose (TAC) film (Fujifilm Corporation, refractive index: 1.48, thickness: 80 μm, width: 300 mm) was prepared.

[Formation of Alignment Layer]

A coating liquid for forming an alignment layer was prepared by stirring a mixture including pure water (96 parts by mass) and PVA-205 (4 parts by mass, Kuraray Co., Ltd., polyvinyl alcohol) in a container kept warm at 80° C. Using a bar (count: 6), the above-described coating liquid for forming an alignment layer was applied onto the substrate (triacetyl cellulose film), and then dried in an oven at 100° C. for 10 minutes. By the above-described procedure, an alignment layer having a film thickness of 2 μm was formed on the substrate.

[Formation of Cholesteric Liquid Crystal Film]

By the following procedure, a cholesteric liquid crystal film having a film thickness of 8 μm was formed on the alignment layer.

(Preparation of Coating Liquid (1) for Forming Liquid Crystal Layer)

After mixing each component shown below, a coating liquid (1) for forming a liquid crystal layer was prepared by filtering using a polypropylene filter (pore diameter: 0.2 μm).

—Components—

(1) Rod-like thermotropic liquid crystal compound (compound (A) shown below): 100 parts by mass (2) Chiral agent (compound (B) shown below, Palicolor (registered trademark) LC756, BASF): 1.2 parts by mass (3) Photopolymerization initiator 1 (2-methyl-1-(4-methylthiophenyl)-2-morpholinopropan-1-one, Omnirad 907, IGM Resins B.V.): 3 parts by mass (4) Photopolymerization initiator 2 (PM758, Nippon Kayaku Co., Ltd.): 1 part by mass (5) Alignment restriction agent (compound (C) shown below): 0.5 parts by mass (6) Solvent (methyl ethyl ketone): 184 parts by mass (7) Solvent (cyclohexanone): 31 parts by mass The compound (A) is a mixture of the following three compounds. The content of each compound in the mixture is 84% by mass, 14% by mass, and 2% by mass in order from the top.

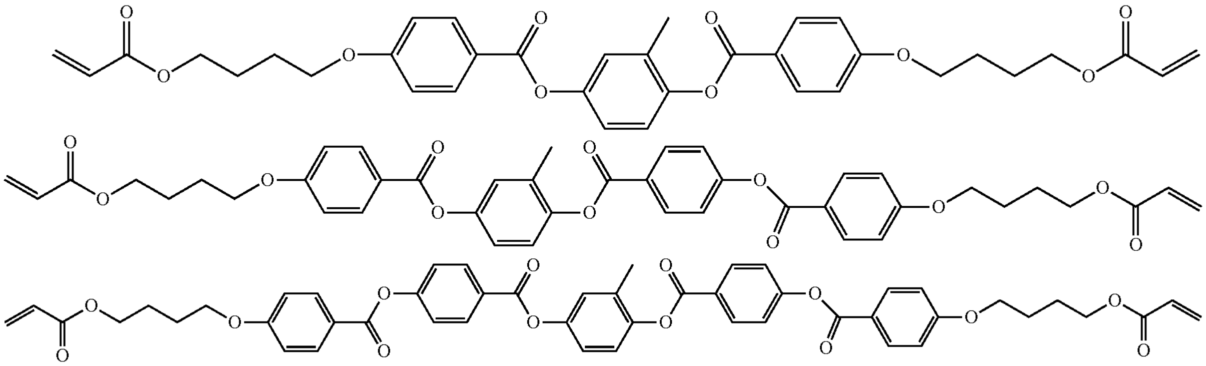

A chemical structure of the compound (B) is shown below.

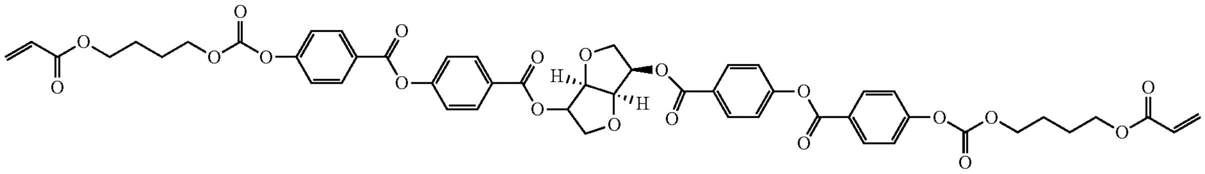 [SMILES: C=CC(=O)OCCCCOC(=O)Oc1ccc(C(=O)Oc2ccc(C(=O)OC3CO[C@H]4[C@@H]3OC[C@H]4OC(=O)c3ccc(OC(=O)c4ccc(OC(=O)OCCCCOC(=O)C=C)cc4)cc3)cc2)cc1]

A chemical structure of the compound (C) is shown below.

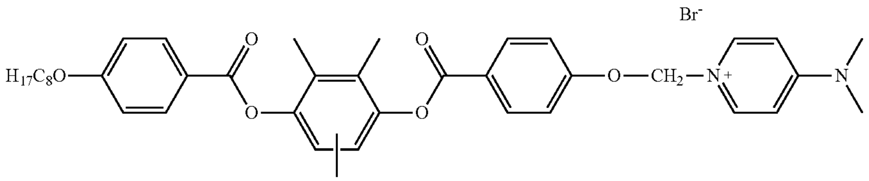

(Coating)

The substrate having the alignment layer was heated at 70° C., and then the coating liquid (1) for forming a liquid crystal layer was applied onto the alignment layer using a bar (count: 18).

(Drying)

The coating liquid (1) for forming a liquid crystal layer, which had been applied onto the alignment layer, was dried in an oven at 70° C. for 1 minute to form a coating film having a film thickness of 10 μm.

(Application of Shearing Force)

With the coating film heated to 70° C., a stainless steel blade heated to 70° C. was brought into contact with the coating film, and then a shearing force of a shear rate of 2500 seconds$^{-1}$ was applied to the coating film by moving the blade at a speed of 1.5 m/min while keeping the stainless steel blade in contact with the coating film. A moving distance of the blade was 30 mm.

A residual solvent ratio of the coating film to which the shearing force was applied was less than 1% by mass.

A film thickness of the coating film after applying the shearing force was 8 μm.

(Curing)

The coating film to which the shearing force was applied was irradiated with ultraviolet rays (exposure amount: 500 mJ/cm$^2$) using a metal halide lamp to cure the coating film.

Example 2

A cholesteric liquid crystal film of Example 2 was manufactured by the same procedure as in Example 1, except that a coating liquid (2) for forming a liquid crystal layer, in which the rod-like thermotropic liquid crystal compound was changed to the following compound (D) was used.

A chemical structure of the compound (D) is shown below.

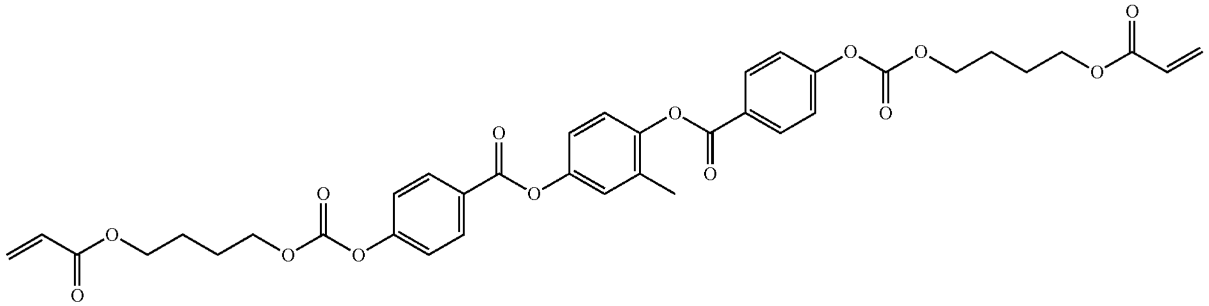 [SMILES: C=CC(=O)OCCCCOC(=O)Oc1ccc(C(=O)Oc2ccc(OC(=O)c3ccc(OC(=O)OCCCCOC(=O)C=C)cc3)c(C)c2)cc1]

Example 3

A coating liquid (3) for forming a liquid crystal layer was prepared in the same manner as in Example 1, except that the following components were used.

—Components—

(1) Rod-like thermotropic liquid crystal compound (compound (A) shown above): 100 parts by mass (2) Chiral agent (compound (E) shown below): 1.2 parts by mass (3) Photopolymerization initiator 2 (PM758, Nippon Kayaku Co., Ltd.): 3 parts by mass (4) Photopolymerization initiator 3 (IRGANOX (registered trademark) 1010, BASF): 1 part by mass (5) Alignment restriction agent (compound (C) shown above): 0.5 parts by mass (6) Solvent (methyl ethyl ketone): 184 parts by mass (7) Solvent (cyclohexanone): 31 parts by mass A chemical structure of the compound (E) is shown below.

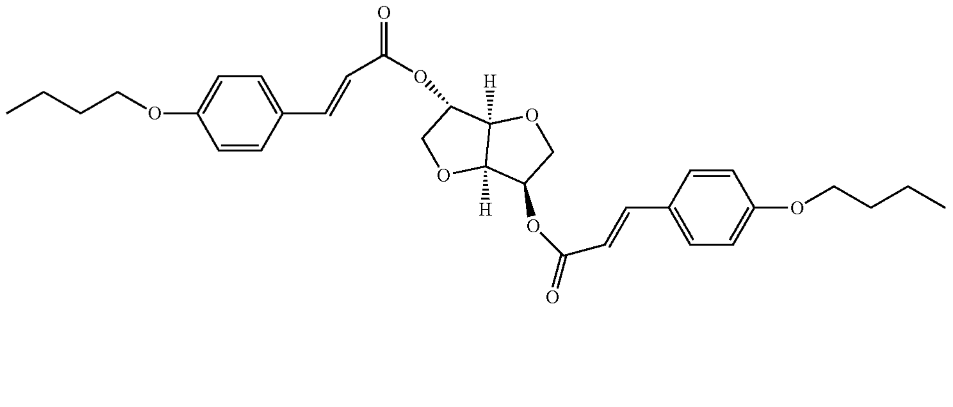 [SMILES: CCCCOc1ccc(/C=C/C(=O)O[C@H]2CO[C@H]3[C@@H]2OC[C@H]3OC(=O)/C=C/c2ccc(OCCCC)cc2)cc1]

Subsequently, a cholesteric liquid crystal film of Example 3 was manufactured by the same procedure as in Example 1, except that the obtained coating liquid (3) for forming a liquid crystal layer was used and the following curing was performed.

(Curing)

The coating film to which the shearing force was applied was cured by irradiating the coating film with ultraviolet rays (exposure amount: 5 $mJ/cm^2$) of a high-pressure mercury lamp (HOYA Corporation, UL750) through a long-wavelength cut filter (Asahi Spectra Co., Ltd., SH0325).

FIG. 1 is an observation image captured by a polarization microscope from an upper surface (front surface) of the cholesteric liquid crystal film of Example 1.

Comparative Example 1

A cholesteric liquid crystal film of Comparative Example 1 was manufactured by the same procedure as in Example 1, except that the thickness of the coating film obtained through drying (that is, the thickness of the coating film before applying the shearing force) was changed to 25 μm, and then the following shearing force was applied.

Figure 6:
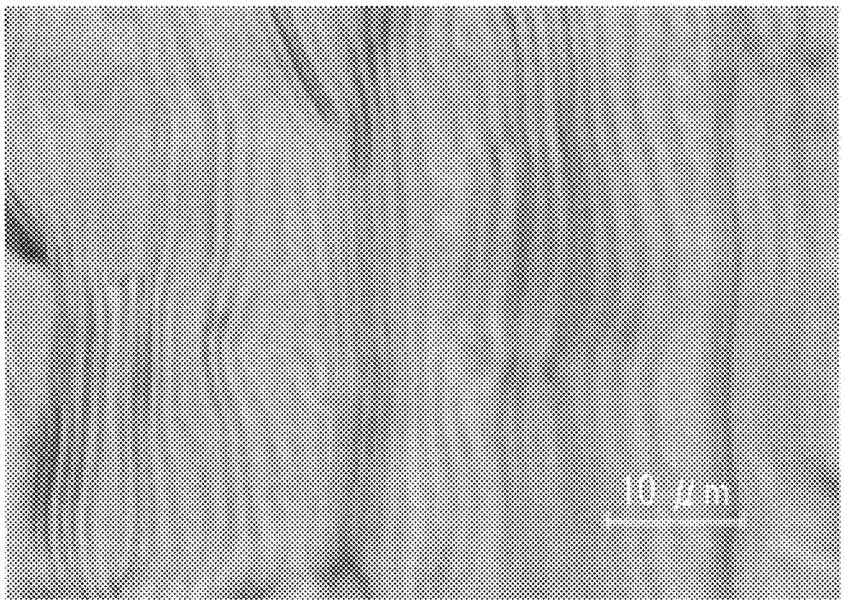
FIG. 6 is an observation image captured by a polarization microscope from an upper surface of a cholesteric liquid crystal film of Comparative Example 1.

FIG. 6 shows an observation image captured by a polarization microscope from an upper surface (front surface) of the cholesteric liquid crystal film of Comparative Example 1.

(Application of Shearing Force)

With the coating film heated to 110° C., a stainless steel blade heated to 110° C. was brought into contact with the coating film, and then a shearing force of a shear rate of 600 $seconds^{-1}$ was applied to the coating film by moving the blade at a speed of 0.9 m/min while keeping the stainless steel blade in contact with the coating film. A moving distance of the blade was 30 mm.

A film thickness of the coating film after applying the shearing force was 22 μm.

Comparative Example 2

A cholesteric liquid crystal film of Comparative Example 2 was manufactured by the same procedure as in Example 1, except that the dried coating film was cured without applying the shearing force to the coating film.

Figure 7:
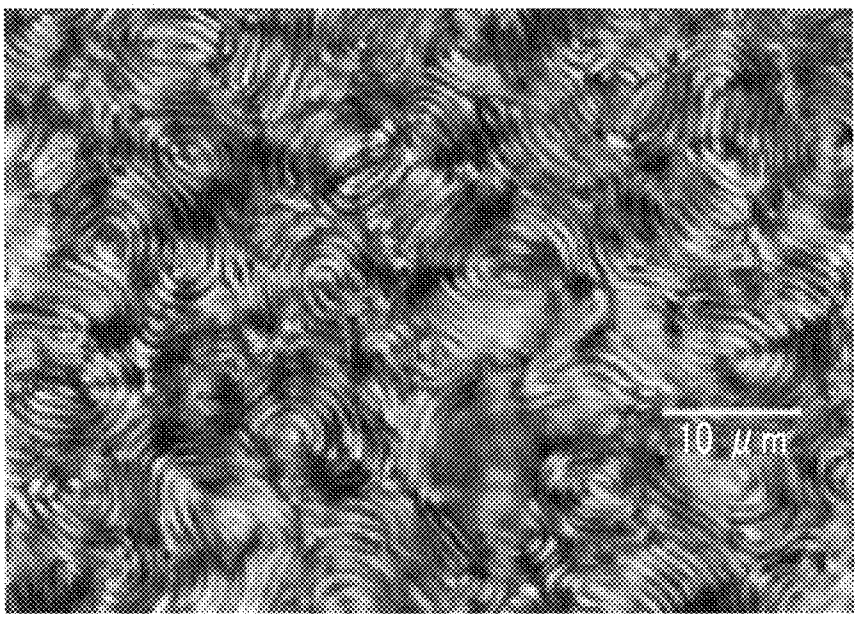
FIG. 7 is an observation image captured by a polarization microscope from an upper surface of a cholesteric liquid crystal film of Comparative Example 2.

FIG. 7 shows an observation image captured by a polarization microscope from an upper surface (front surface) of the cholesteric liquid crystal film of Comparative Example 2.

As is clear from FIG. 7, in the cholesteric liquid crystal film of Comparative Example 2, a stripe pattern in which the dark portions and the bright portions are alternately arranged in a straight line is not seen by the polarization microscope from the upper surface (front surface).

[Microscopic Observation of Upper Surface and of Cross Section in Thickness Direction]

An image was captured from the upper surface of the obtained cholesteric liquid crystal film using a polarization microscope NV100LPOL manufactured by Nikon Corporation, and a linear stripe pattern was observed from the photographic image.

The microscopic observation from the upper surface was performed on both the front surface (here, the surface to which the shearing force was applied) and the back surface (here, the contact surface with the substrate) of the cholesteric liquid crystal film.

In addition, the obtained cholesteric liquid crystal film was cut with a microtome, a cross-sectional image was captured using a polarization microscope NV100LPOL manufactured by Nikon Corporation, and a cross-sectional stripe pattern was observed from the cross-sectional photographic image.

In addition, the distance between dark portions, the number of bonding points, and the inclined angle of the dark portions were also obtained.

The results are shown in Table 1.

In Comparative Example 1, since the linear stripe pattern could not be confirmed in the observation from the upper surface (front surface and back surface), the distance between dark portions and the number of bonding points were not obtained.

[Periodic Change in Refractive Index]

The fact that a highly linear stripe pattern can be seen by the microscopic observation of the upper surface of the cholesteric liquid crystal film indicates that the helical structures of the cholesteric liquid crystal with almost the same period are regularly arranged along a certain straight line. In the helical structures of the cholesteric liquid crystal of the same period, the molecular axes of the liquid crystal compounds are similarly revolved and arranged in a helical shape. Since a refractive index of the cholesteric liquid crystal film changes depending on the orientation of the molecular axis of the liquid crystal compound on the upper surface, as described above, by observing the upper surface of the cholesteric liquid crystal film with a microscope, it can be determined that the refractive index changes periodically along the stripe pattern by observing the stripe pattern with high linearity.

From the above, it can be said that the refractive index of the cholesteric liquid crystal films of Examples 1 to 3 changes periodically because they have a linear stripe pattern.

TABLE 1

| | Observation from upper surface (front surface) | | | | Observation from upper surface (back surface) | | | | Observation of cross section | |
|---|---|---|---|---|---|---|---|---|---|---|
| | Stripe pattern | | | | Stripe pattern | | | | Cross-sectional stripe pattern | |
| | Presence or absence | Linearity | Distance between dark portions [μm] | Number of bonding points [point] | Presence or absence | Linearity | Distance between dark portions [μm] | Number of bonding points [point] | Presence or absence | Inclined angle [°] |
| Example 1 | Presence | Yes | 1.2 | 0.6 | Presence | Yes | 1.2 | 11.0 | Presence | 42 |
| Example 2 | Presence | Yes | 1.2 | 0.8 | Presence | Yes | 1.2 | 12.2 | Presence | 32 |
| Example 3 | Presence | Yes | 1.4 | 1.0 | Presence | Yes | 1.4 | 11.4 | Presence | 88 |
| Comparative Example 1 | Presence | None | — | — | Presence | None | — | — | Presence | 9 (flapping) |

As is clear from Table 1, in the cholesteric liquid crystal films of Examples, a stripe pattern in which the dark portions and the bright portions are alternately arranged in a straight line was observed by the microscopic observation from the upper surface.

In addition, in the cholesteric liquid crystal films of Examples, a stripe pattern in which the dark portions and the bright portions are alternately arranged was observed by the microscopic observation of the cross section in the thickness direction.

EXPLANATION OF REFERENCES

1: cholesteric liquid crystal film
10: dark portion
20: bright portion
30: bonding point
40: rod-like liquid crystal compound
40A: molecular axis
100: application device
200: drying device
300: blade
400: light source
500, 510: transport roll
600, 610: backup roll
F: substrate
Fa, Fb: main surface
HA: helical axis
θ: inclined angle with respect to main surface of dark portions in cross-sectional stripe pattern The disclosure of JP2020-015749 filed on Jan. 31, 2020 is incorporated in the present specification by reference. All documents, patent applications, and technical standards described in the present specification are herein incorporated by reference to the same extent that each individual document, patent application, or technical standard was specifically and individually indicated to be incorporated by reference.

What is claimed is:

1. A cholesteric liquid crystal film comprising:
a cholesteric liquid crystal,
wherein the cholesteric liquid crystal film has a stripe pattern in which dark portions and bright portions are alternately arranged in a straight line on an upper surface observed with a microscope, and
wherein the upper surface observed with a microscope has a bonding point at which the dark portions are bonded to each other.

2. The cholesteric liquid crystal film according to claim 1, wherein
the number of the bonding points is 10 or less per 50 μm square area.

3. The cholesteric liquid crystal film according to claim 1, wherein a distance between adjacent dark portions is 0.01 μm to 50 μm.

4. The cholesteric liquid crystal film according to claim 1, wherein the cholesteric liquid crystal film has a stripe pattern in which dark portions and bright portions are alternately arranged on a cross section in a thickness direction observed with a microscope, and
the dark portions are inclined with respect to a main surface.

5. The cholesteric liquid crystal film according to claim 4, wherein an inclined angle of the dark portions with respect to the main surface is 20° to 90°.

* * * * *